United States Patent
Forbes et al.

(10) Patent No.: US 10,223,998 B2
(45) Date of Patent: Mar. 5, 2019

(54) DYNAMIC CONTENT ANALYSIS AND ENGAGEMENT SYSTEM FOR SHARED DISPLAYS

(71) Applicant: The Painted City Incorporated, Vashon, WA (US)

(72) Inventors: John Bruce Forbes, Seattle, WA (US); Felix Misch, Vashon, WA (US); Timothy S. Jenks, Vashon, WA (US)

(73) Assignee: The Painted City Incorporated, Vashon, WA (US)

( * ) Notice: Subject to any disclaimer, the term of this patent is extended or adjusted under 35 U.S.C. 154(b) by 189 days.

(21) Appl. No.: 15/075,019

(22) Filed: Mar. 18, 2016

(65) Prior Publication Data

US 2016/0275833 A1    Sep. 22, 2016

Related U.S. Application Data

(60) Provisional application No. 62/134,708, filed on Mar. 18, 2015.

(51) Int. Cl.
  *G09G 5/00*     (2006.01)
  *G06K 9/00*     (2006.01)
  (Continued)

(52) U.S. Cl.
  CPC ............ *G09G 5/003* (2013.01); *G06F 3/147* (2013.01); *G06K 9/00335* (2013.01);
  (Continued)

(58) Field of Classification Search
  CPC ...... G09G 5/003; G06F 3/147; G07F 17/3272
  (Continued)

(56) References Cited

U.S. PATENT DOCUMENTS 6,484,148 B1    11/2002 Boyd
7,800,514 B2    9/2010 Lyle et al.
(Continued)

FOREIGN PATENT DOCUMENTS

WO    2013/025803    2/2013

OTHER PUBLICATIONS

Written Opinion of the International Searching Authority completed Jul. 19, 2016, in International Patent Application No. PCT/US2016/023304, 5 pages.
(Continued)

*Primary Examiner* — Calvin C Ma
(74) *Attorney, Agent, or Firm* — Ellen M. Bierman; Lowe Graham Jones PLLC

(57) ABSTRACT

Methods, systems, and techniques for analyzing the level of engagement of viewers of shared digital displays and enhancing that engagement by dynamically modifying the content of the display and incorporating personalized content created by viewers are provided. One example embodiment is the Dynamic Content Analysis and Engagement System (DCAES), which enables the operator of the system to analyze engagement, generate metrics, manage owner and viewer generated content, and dynamically modify the content on the shared display to increase the engagement of the viewer. In one example embodiment, the DCAES comprises an attention sensor module, an analysis module, a content management module, and a display control module.

19 Claims, 9 Drawing Sheets

(51) Int. Cl.
*G06F 3/147* (2006.01)
*H04N 21/00* (2011.01)
*H04N 21/41* (2011.01)
*H04N 21/442* (2011.01)
*H04N 21/466* (2011.01)

(52) U.S. Cl.
CPC ......... *H04N 21/00* (2013.01); *H04N 21/4122* (2013.01); *H04N 21/44204* (2013.01); *H04N 21/44222* (2013.01); *H04N 21/4667* (2013.01); *H04N 21/4668* (2013.01); *G09G 2354/00* (2013.01)

(58) Field of Classification Search
USPC .................. 345/1; 705/14.42, 14.53; 725/12
See application file for complete search history.

(56) References Cited

U.S. PATENT DOCUMENTS

| | | | |
|---|---|---|---|
| 7,925,549 | B2 | 4/2011 | Looney et al. |
| 8,589,230 | B1 | 11/2013 | Bickerstaff |
| 9,035,879 | B2 | 5/2015 | Vendrow |
| 9,047,256 | B2 | 6/2015 | Carlson et al. |
| 9,087,465 | B2 | 7/2015 | Griffin et al. |
| 9,100,685 | B2 | 8/2015 | Conrad et al. |
| 2005/0021393 | A1 | 1/2005 | Bao et al. |
| 2009/0195392 | A1 | 8/2009 | Zalewski |
| 2010/0328492 | A1 | 12/2010 | Fedorovskaya et al. |
| 2012/0026309 | A1 | 2/2012 | Lee et al. |
| 2012/0124456 | A1 | 5/2012 | Perez et al. |
| 2013/0073388 | A1* | 3/2013 | Heath .................... G06Q 30/02 705/14.53 |
| 2013/0152113 | A1* | 6/2013 | Conrad ............ H04N 21/42201 725/12 |
| 2013/0310122 | A1* | 11/2013 | Piccionielli ......... G07F 17/3272 463/2 |
| 2013/0339127 | A1* | 12/2013 | Plut ........................ G06Q 30/02 705/14.42 |
| 2014/0086498 | A1 | 3/2014 | Matraszek et al. |
| 2015/0363828 | A1 | 12/2015 | Mantalovos |

OTHER PUBLICATIONS

International Search Report of the International Searching Authority completed Jul. 19, 2016, in International Patent Application No. PCT/US2016/023304, 3 pages.

Banikowski, Alison K., "Strategies to Enhance Memory Based on Brain-Research," Focus on Exceptional Children, 0015511X, Oct. 1999, vol. 32, Issue 2, 22 pages.

Gausby, Alyson, "Attention spans," Consumer Insights, Microsoft Canada, Spring 2015, 52 pages.

Rosier, James Tyler, "Art and Memory: An Examination of the Learning Benefits of Visual-Art Exposure," (2010), Electronic Theses & Dissertations, Paper 436, 58 pages.

\* cited by examiner

DYNAMIC CONTENT ANALYSIS AND ENGAGEMENT SYSTEM FOR SHARED DISPLAYS

CROSS-REFERENCE SECTION

This application claims benefit to U.S. Application No. 62/134,708, entitled "Electronic System For Creating and Displaying an Artwork and System to Facilitate Communication Between Digital Signage and Mobile Devices," filed Mar. 18, 2015, which is incorporated herein by reference in its entirety.

TECHNICAL FIELD

The present disclosure relates to methods, techniques, and systems for analyzing the level of engagement of viewers of shared displays and enhancing that engagement by dynamically modifying the content of the display.

BACKGROUND

Attention can be defined as focused mental engagement on or involvement with a particular item of information. Human attention is an increasingly scarce commodity, to the point that there are new economic models emerging, such as the "attention economy" which applies economic theory to the acquisition and retention of attention.

With the dramatic increase of portable computing and communication systems such as laptops, tablets and smartphones, people find that their attention is increasingly divided. Interruptions such as email, texting and push notifications further intrude on people's attention. A recent study by Microsoft (*Attention Spans, Consumer Insights, Microsoft Canada, Spring,* 2015) showed that the average consumer attention span was only 12 seconds in 2000, and had further declined to 8 seconds by 2013.

One of the ubiquitous devices that is currently competing for the attention of consumers is shared digital displays, which are often located in public places. Whether we are in the elevator, the airport, a sports stadium, or simply walking down the street one can observe these shared digital displays everywhere. They all contain information that is seeking to capture our attention—whether it is an electronic billboard, a schedule of activities in a hotel, or sports highlights and statistics projected on a giant display in a stadium before a sporting event.

When the information on a shared digital display truly captures a viewer's attention, the benefits to comprehension and retention are substantial. Most information-processing models of memory have three major components: a sensory register, a working (or short-term) memory, and a long-term memory. When an item of information suddenly becomes the sole focus of the viewer, comprehension and retention of the information increases as it moves from sensory memory into short term memory, and then from short term into long term memory. The longer the viewer focuses on the content, the higher the rate of comprehension and retention. (See *Strategies to Enhance Memory Based on Brain Research Banikowski,* Alison K., "Focus on Exceptional Children," 0015511X, October 99, Vol. 32, Issue 2.)

Research has also shown that certain types of creative activities enhance memory and retention of information. Creating art, viewing art, and discriminating among visually presented shapes also has been shown to enhance memory (Rosier, James Tyler, *Art and Memory: An Examination of the Learning Benefits of Visual-Art Exposure.* Thesis, Georgia Southern University, 2010)

Traditional approaches to wrestling with measuring engagement have provided a very limited ability to track and analyze viewer engagement with information which is shown on shared digital displays. The most traditional metric is "CPI", a standard marketing metric that is defined as cost per impression. The simplest method for measuring CPI on a shared digital display is simply to count the number of people walking past the display. In the past this was done manually, More recently, cameras have been installed that use automated methods to count traffic. This obviously has very limited utility, as measuring traffic past the display does not effectively measure engagement—how involved the viewer is with what is displayed.

Other approaches have placed a variety of sensors on or near shared displays to identify viewers and do things like raise or lower the display as well as increase font size depending on the distance of the viewer from the display.

Additional approaches have collected data by fitting the viewers with physiological monitors and attempting to analyze engagement by monitoring heartrate and other physiological factors, or analyzing their facial expressions for laughing or anger, and the like.

DETAILED DESCRIPTION

Embodiments described herein provide enhanced computer- and network-based methods, techniques, and systems for analyzing the level of engagement of viewers of shared digital displays and enhancing and prolonging that engagement by dynamically modifying the content of the display, and providing mechanisms for viewers to interact with the content on the shared display. One example embodiment is the Dynamic Content Analysis and Engagement System (DCAES), which enables the operator of the DCAES to analyze engagement, generate metrics, manage operator generated content as well as personalized content supplied by the viewer, and dynamically modify the contents of the screen, in some cases responsive to the engagement metrics analyzed.

One of the goals of the DCAES is to increase the level of engagement of viewer(s). Engagement has a number of parameters that may be used to calculate the level of engagement. The first is dwell time. Dwell time is typically measured by the total time that elapses between when the viewer starts to look at a shared digital display (or a specific item of information shown on a shared digital display), and the time when the viewer looks away. Apart from dwell time, the level of engagement is also increased by active participation in activities; with passive viewing being the lowest level and active activities like contributing personalized content and participating in voting, scoring, or ranking of information representing higher levels of engagement. Thus, the various attributes of passive viewing taken in combination with active participation measurements such as voting may be used to calculate the level of engagement of a viewer.

Figure 9:
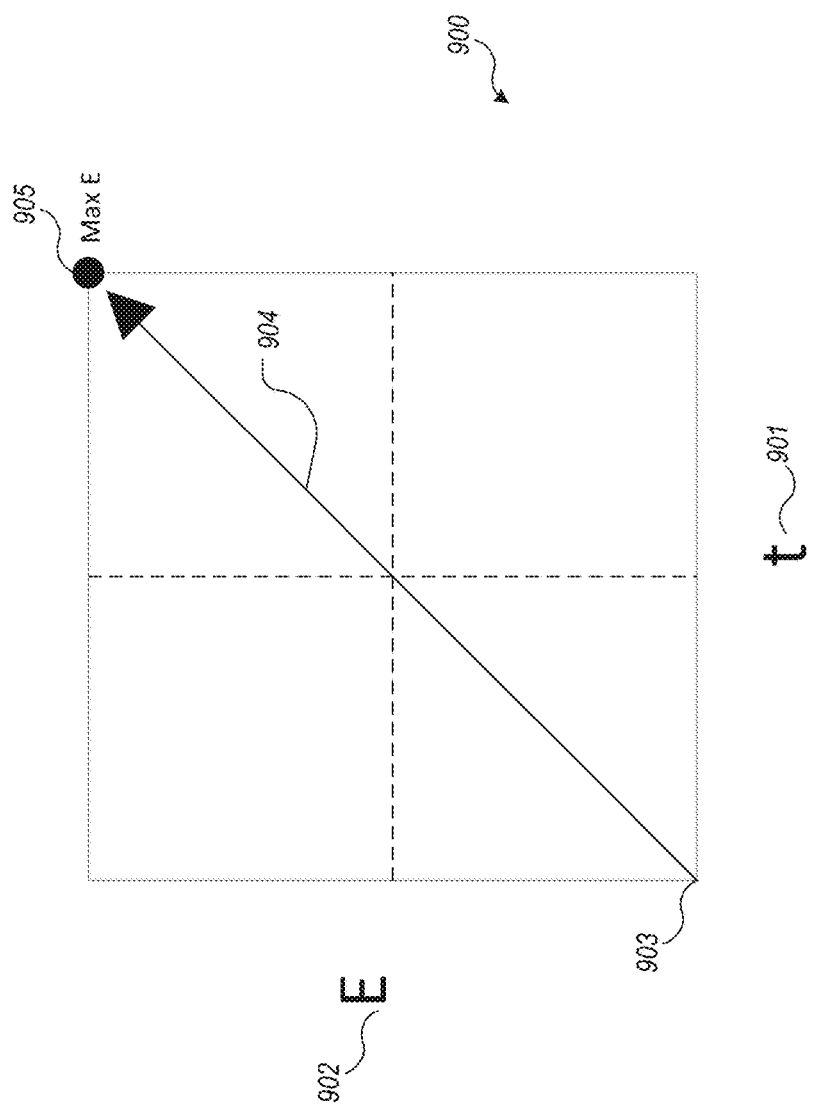
FIG. 9 is an example graph showing increasing levels of viewer engagement over time.

FIG. 9 is an example graph showing increasing levels of viewer engagement over time. The x-axis reflects time spent viewing the information and the y-axis reflects the level of engagement. In overview, block 900 illustrates an example graph of engagement. The x-axis, t 901, represents the dwell time of the viewer. The y-axis, E 902, represents the level of engagement of the viewer. Point 903 of the graph is the point at which t and E are zero, which represents no engagement by the viewer. Line 904 represents movement of the viewer from zero engagement to maximum engagement, over time "t" 901. The goal of the system is to move the viewer along this line towards maximum engagement. Point 905 is the point of maximum engagement, where the viewer is focusing all attention on the information and is interacting with it.

One of the ways to dramatically increase the level of viewer engagement with content on a shared digital display is to allow viewers to interact with it and modify it by contributing their own personalized content. Psychological studies have shown that when viewers are involved in creating or modifying content they stay engaged longer and retain much more of the information from the shared digital display. Examples of creating personalized content include activities such as "selfies," photographs, pictures drawn with paint programs, and modifying existing images or templates using any one of a variety of graphics applications, and the like. Painting and other applications that create or enhance personalized content can be single user or multiuser.

Another way to increase the level of engagement of the viewer is to have them rate the content. Rating may include voting, scoring, ranking or otherwise indicating an opinion of content, either as an individual item or in aggregate. The rating of content may occur on the shared display or on the viewers personal device such as a smartphone or laptop and may be synchronous or asynchronous For the owners and operators of shared digital displays, there are many additional potential benefits that become possible when the viewer is fully engaged with the content displayed. If the system can track the viewer's engagement and interaction with the content, a rich set of metrics can be gathered that can be used to create additional value. For instance, the system can determine how long the viewer stays engaged with the information, and in many cases what individual item is holding their attention. The content on the shared digital display can then be dynamically modified to sustain and increase the level of engagement of the viewer. For example, in a shared digital display on an elevator, depending on which type of information the viewer is focusing his attention on, the content may be changed to expand the area devoted to displaying community news, advertisements, facts about the building, information on locations and hours of certain facilities in the building and the like. As another example, an electronic billboard may display different advertising at different times of day or target different audiences based upon the metrics gathered and analyzed regarding the level of engagement of its audience. As another example, the system can populate the display with content that has been rated by one viewer or a set of viewers as being highly engaging. As another example, an advertisement for a product such as a car may be expanded to supply additional information about the specifications or pricing of the vehicle if the viewer shows a given level of engagement. As another example, a news item may be expanded to include additional coverage if the viewer shows a high level of engagement.

Further, the system may analyze engagement metrics using machine intelligence algorithms such as Bayesian algorithms, and other machine learning algorithms and/or statistics to determine the optimum display of content. The DCAES may also store those optimized configurations as Content Templates which include a list of system and personalized content as well as display formatting that can be reused at different times of day or with different groups of viewers as a basis for producing content.

New technologies such as image processing and time-of-flight (TOF) sensors allow the collection of much richer data regarding the engagement and attention span of viewers of information delivered via shared digital displays than available using prior techniques. This can include improved metrics like dwell time, focus point on the display, the 3D (three dimensional) location of the consumer in relation to the screen, and even demographic data.

One significant advantage of the DCAES is that, unlike former methods of measurement, it is non-intrusive. Previous solutions required viewers to wear biofeedback monitors, provide the system with personal profiles with sensitive personal information, or pass "cookies" with personal information without viewer awareness. In contrast, DCAES can collect metrics on engagement without requiring to viewer to do anything differently than they normally would do.

The Dynamic Content Analysis and Engagement System is structured (e.g., configured) to analyze engagement, generate metrics, manage received content, and dynamically modify the contents of the screen responsive to what it "learns" regarding observed engagement in order, for example, to maximize the level of engagement of one or more viewers with a particular shared display.

Figure 1:
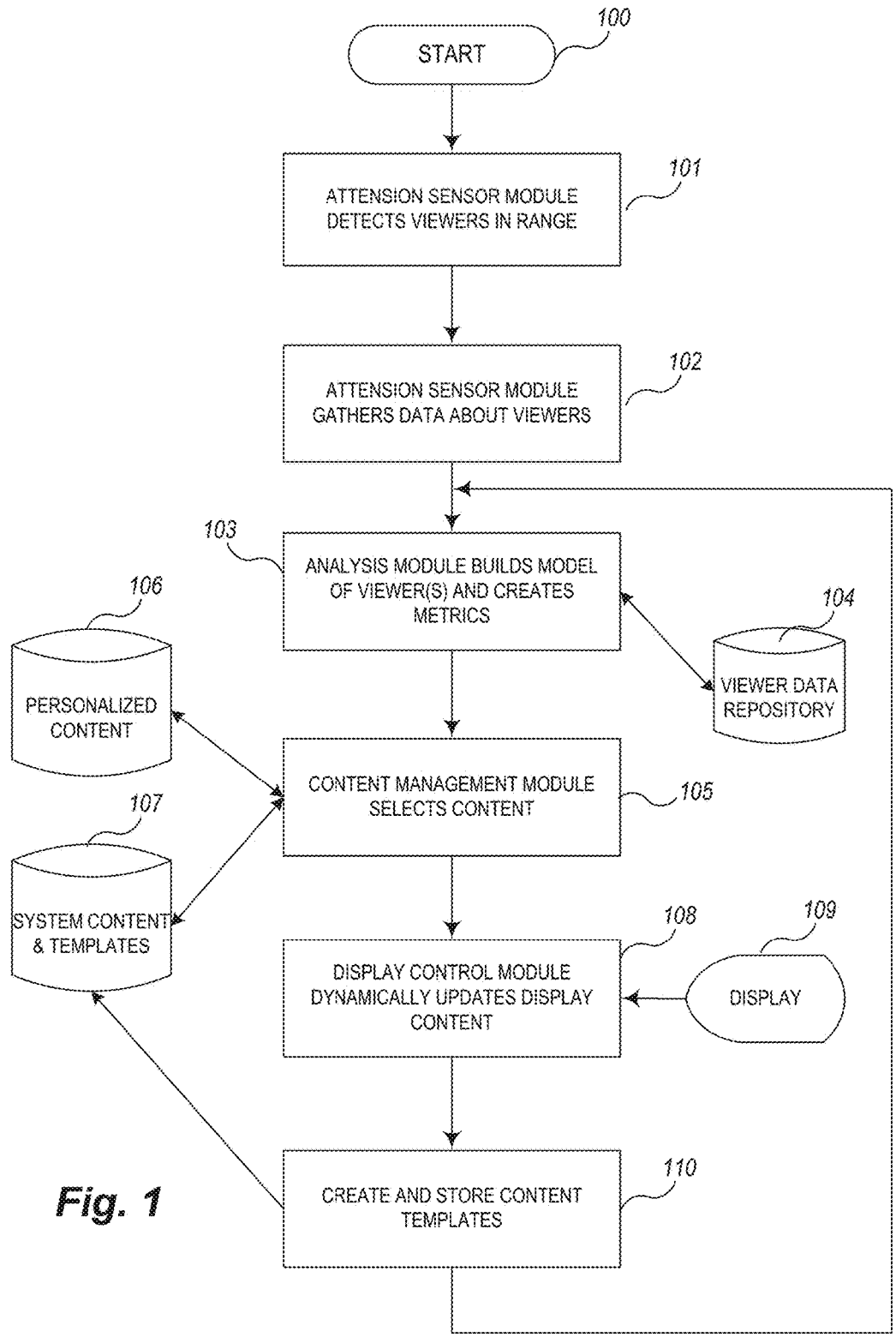
FIG. 1 is an example flow diagram of operation of an example Dynamic Content Analysis and Engagement System.

FIG. 1 is an example flow diagram of operation of an example Dynamic Content Analysis and Engagement System. In overview, in block 101 an attention sensor module detects viewers in range of the shared display and in block 102 gathers data about viewers. In block 103, a model of viewers is built and metrics are created. In some embodiments, these models and metrics are stored in a viewer data repository 104 (such as a database, file, or any other type of storage). Then, in block 105, content is selected from one or more of system content 107 and/or personalized (viewer) content 106. In block 108, the shared display 109 is then dynamically updated based upon the selected content. In block 110, a Content Template may be stored if appropriate. A Content Template contains information regarding content and display formatting including a list of system and viewer generated content to be used, screen layout information, the time that various items of content are to be displayed, user interface configuration information, and presenting opportunities to the viewer(s) for adding personalized content and rating that content. The DCAES then returns to block 103 to iterate the process to dynamically refine the content and present enhanced content to the viewer.

In one example embodiment, the DCAES comprises one or more functional components/modules that cooperate to achieve enhanced viewer engagement: an Attention Sensor Module, an Analysis Module, a Content Management Module, and a Display Control Module. These modules are just one example, and different implementations can be utilized to achieve a similar result.

Figure 2:
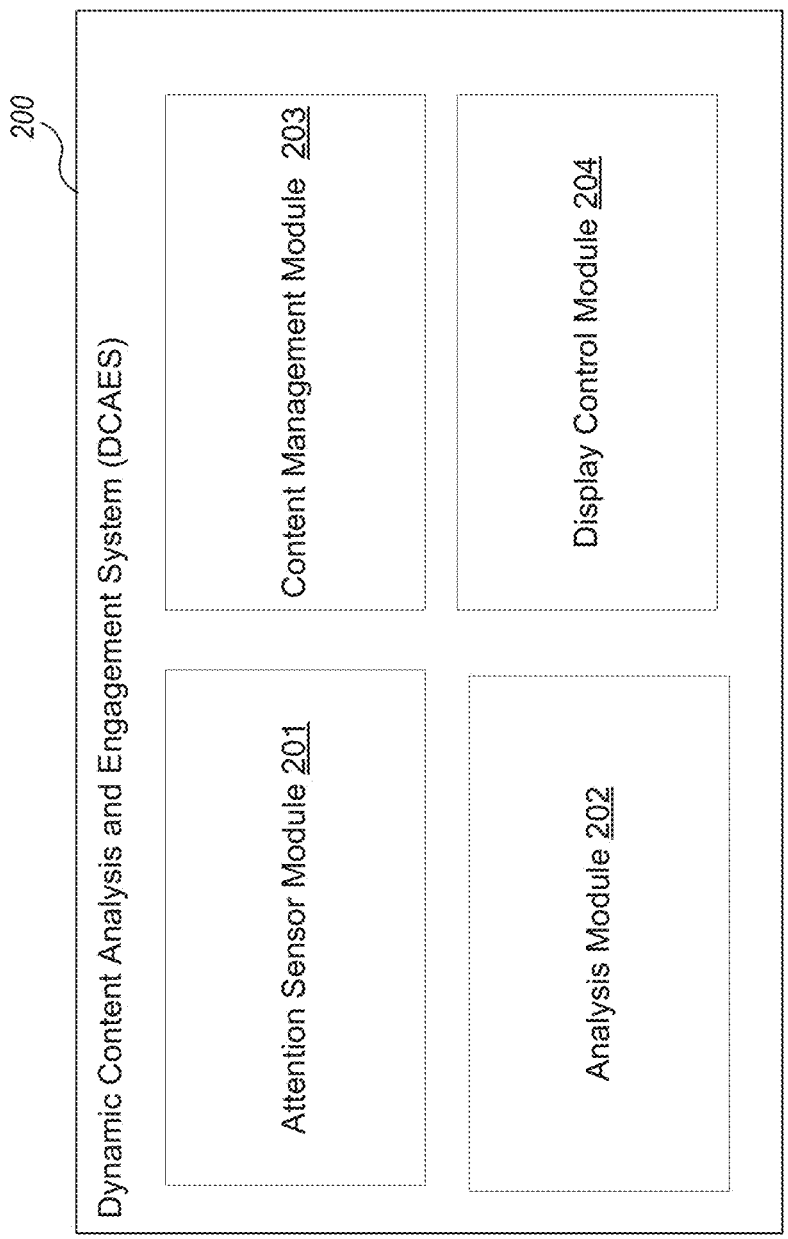
FIG. 2 is an example block diagram of a Dynamic Content Analysis and Engagement System used to perform the operations described with reference to FIG. 1.

FIG. 2 is an example block diagram of a Dynamic Content Analysis and Engagement System used to perform the operations described with reference to FIG. 1. The DCAES (200) comprises an Attention Sensor Module 201, an Analysis Module 202, a Content Management Module 203, and a Display Control Module 204.

The Attention Sensor Module 201 typically contains sensors that recognize when an viewer comes into range, and the DCAES either prompts them to log in or automatically logs them into the system. These sensors may include but are not limited to wireless access points, beacon technology, and the like. Viewers that are not recognized or that decline to log in are still fully scanned by the Attention Sensor Module 201 as described below. The Attention Sensor Module 201 typically utilizes one or more image and/or "time of flight" sensors. The image sensors typically utilize visible light, but may use any other spectrum of electromagnetic radiation. The time of flight data is typically captured using an infrared light emitter and an infrared detector but may also utilize other wavelengths of light or alternative waveforms such as sound waves. RF time of flight sensors operate typically by modulating the outgoing beam with an RF carrier, then measuring the phase shift of that carrier on the receiver side. Other (e.g., direct) time of flight sensors measure the time required for a single laser pulse to leave the camera and reflect back onto the focal plane array. Other time of flight sensors may be similarly incorporated. The Attention Sensor Module may also include audio sensors such as microphones and the like.

Figure 3:
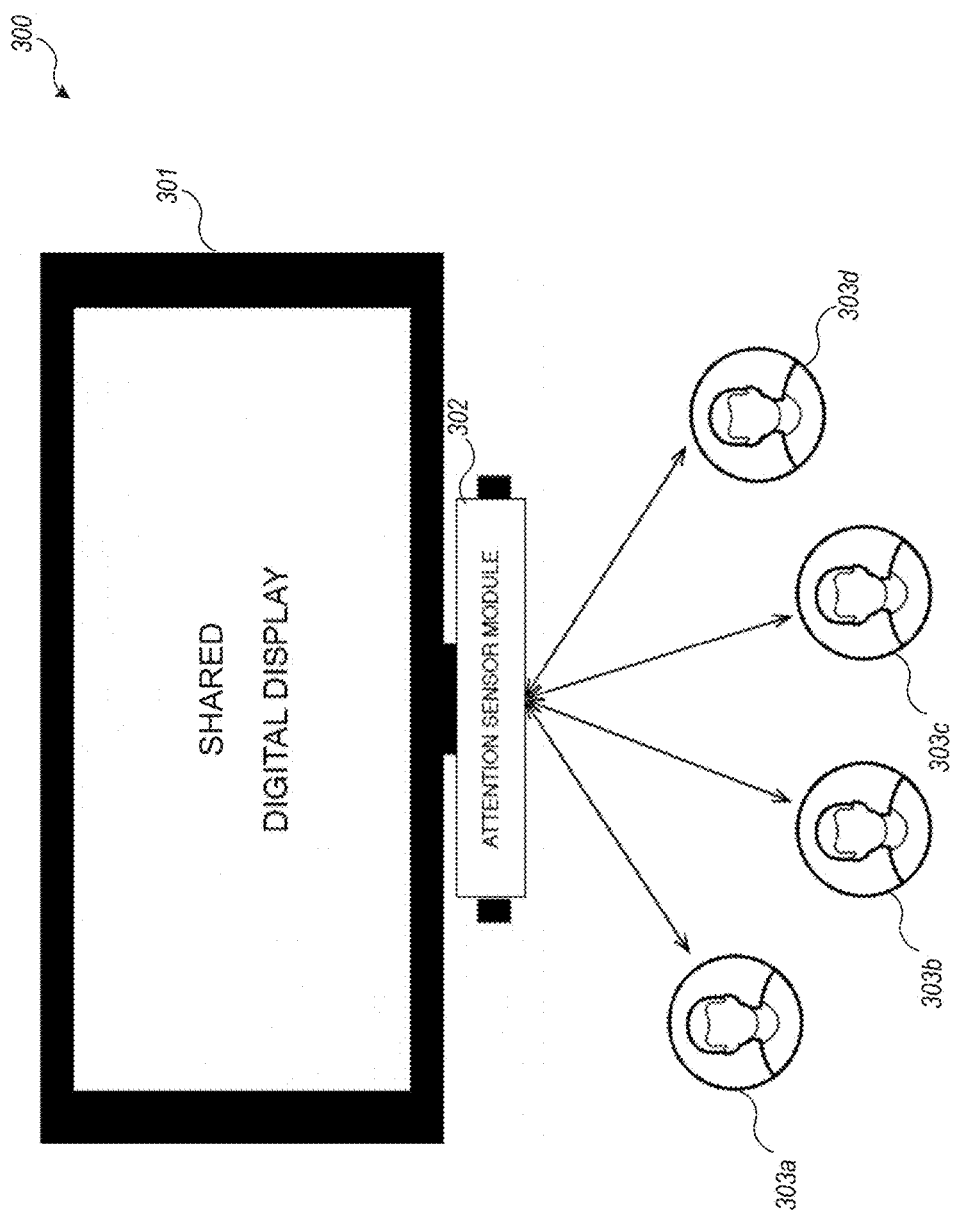
FIG. 3 is an example block diagram of an example sensor module attached to a shared digital display in a Dynamic Content Analysis and Engagement System.

FIG. 3 is an example block diagram of an example sensor module attached to a shared digital display used in a Dynamic Content Analysis and Engagement System environment. In FIG. 3, the DCAES 300 includes a shared digital display 301, an Attention Sensor Module 302, and one or more viewers/content providers 303a-303d. The information from the attention sensor module 302 is sent to the DCAES processing to be analyzed by the Analysis Module 202. As described further below, the DCAES processing may be performed by a computing system that is integrated as part of the shared digital display 301, supplied by a wirelessly or wired connection to a separate processing system, or even connected, for example, via a network, to the "cloud" to be processed by a server remote from the shared display 301 and attention sensor module 302. All such manners of hosting the processing of the DCAES are contemplated including some performed locally and some performed remotely.

Referring back to FIG. 2, the Analysis Module 202 takes the sensor data from the Attention Sensor Module 201 including, for example, image and time of flight data and analyzes it to create a set of metrics about individual viewers, groups of viewers, and the effectiveness of given pieces of content in sustaining viewer engagement. For example, time of flight data may be combined with image data to produce a depth map (or other type of map). This enables the system to build a 3D model of the viewers who are watching the shared digital display. Using the 3D models created by the Analysis Module 202, viewer physical posture and orientation may be recognized and analyzed including but not limited to facing the display, back to the display, oblique to the display, arms crossed, and arms at sides. Gestures may be recognized and analyzed including but not limited to thumbs up, thumbs down, hand raised, hand lowered, pointing, waving, clenched fist, and open hand. Audio data may be incorporated for demographic or content ranking purposes.

In addition to 3D models, facial recognition software and software to determine the area of focus of the viewer may be utilized to generate focus point and dwell time information to measure the level of engagement of the viewer.

The Analysis Module 202 then processes the data to generate metrics including Individual Metrics, Demographic Metrics, Crowd Metrics, and Content Metrics. Individual Metrics include but are not limited to Arrival Time, Departure Time, Viewing Time, Physical Location, Dwell Time, Engaged, Disengaged, Engagement Rating, and Focus Point. Demographic Metrics include but are not limited to Age, Weight, Height, Sex, Ethnicity and Language. Crowd Metrics include but are not limited to Crowd Size, Crowd Turnover, Crowd Engaged, Crowd Disengaged, and Crowd Engagement Rating.

The Content Management Module 203 manages system content provided by the owner of the shared digital display as well as personalized content provided by viewers. These management functions include selecting content, storing and retrieving content, filtering inappropriate content, posting to social media, and the like.

Content to be displayed is selected depending on what mandatory system content has been specified by the owner of the shared display, and what personalized content is available from viewers. When there is space available on the shared digital display for personalized content, viewers may be offered an opportunity to contribute their personalized content to the shared digital display. When a viewer opts to contribute content they are flagged as a "creator". Creators may be rated as to their popularity, and a highly rated creator may be given preference for displaying his own personalized content. Personalized content may either be created offline on a smartphone or other digital or smart device, or created in real time on the shared digital display, or by any other means.

The Content Management Module 203 handles the storage and retrieval of content and Content Templates. Content may be automatically filtered for appropriateness using fully automated, partially automated, or human review systems. Creators may be banned if they submit a certain number of pieces of inappropriate content. Personalized content may be automatically or manually posted to the viewer's social media account, or to the social media account of another entity, which may be running a contest, promotion, show, exhibit, game, or other activity.

The Display Control Module 204 formats and displays content on the shared digital display, and combines system content and personalized content, in some cases based on display templates that can be predefined or dynamically created. The Display Control Module 204 also provides the user interface for operators and viewers which may include user interfaces running on the shared digital display and/or a personal digital device such as a smartphone, tablet, or personal computer and guides the viewer through the process of creating and managing their personalized content. It also handles queueing of content, voting, ranking, and dynamically configuring the shared digital display for maximum viewer engagement. It can also store Content Templates for later use that define collections of content that have been show to be especially engaging to viewers. The Content Management Module 203 and the Display Control Module 204 work together to make sure that the appropriate content appears at the right place on the shared digital display at the right time.

The system is designed to be a multiuser system, so it uses algorithms such as first in-first out queuing to allow creators to submit content and have that content be posted in the order in which it was received. In other instances, the queuing may be influenced for example by other factors such as popularity ratings or other preference ratings as described above. Known mechanisms for implementing a queue data structure (such as arrays, linked lists, etc.) may be used to implement the queues used by the Display Control Module 204. For instance, a creator may submit a "selfie" image from their smartphone and that image then enters a queue for display. Each selfie image in the queue may then be posted in a manner in which it covers some or all of the shared digital display as determined by factors such as the display template or other settings determined by the Display Control Module 204.

Figure 4:
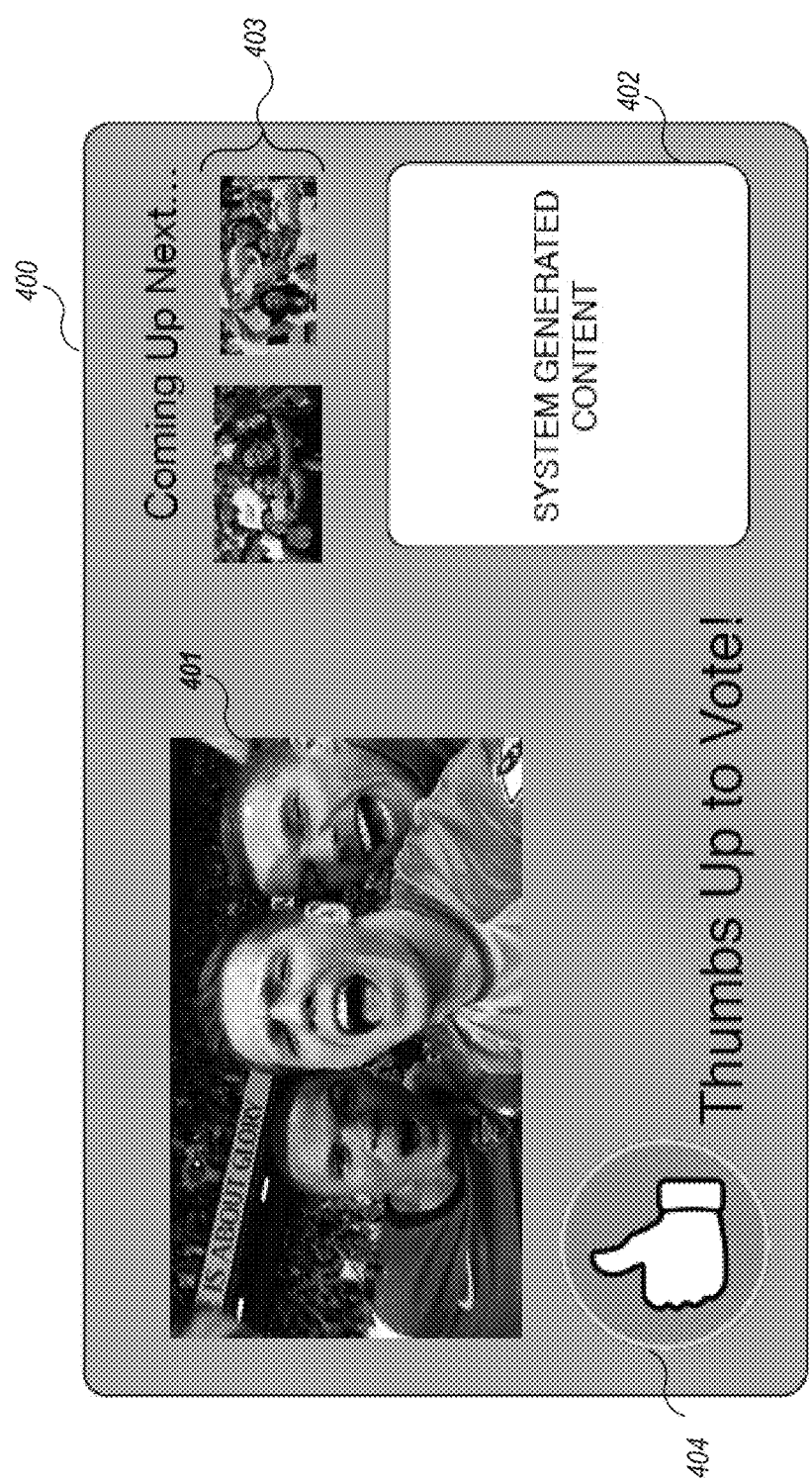
FIG. 4 is an example diagram of dynamic viewer generated content in a Dynamic Content Analysis and Engagement System using Selfies.

FIG. 4 is an example diagram of dynamic viewer generated content in a Dynamic Content Analysis and Engagement System using Selfies. It is an example of a type of display generated by the Display Control Module 204. The currently displayed image 401, which has been submitted by a creator, in this case a selfie, is displayed to the left of the system generated content 402 and is the object of focus. The images that are waiting to be displayed are shown in a queue 403 on the top right of the display.

The Analysis Module 202 can determine the number of people who are watching the display and their relative level of engagement based upon metrics described earlier such as dwell time, participation, etc. Based on their level of engagement the Display Control Module 204 can make adjustments such as to display the image for a longer or shorter period of time, to change position or size of display of some of the images to increase the area for images that are of higher interest to the viewers, and the like.

The DCAES allows viewers to rate images or other content in terms of popularity as part of participatory activity. In the example shown in FIG. 4, viewers can make a "thumbs-up" gesture. Indicator 404 in FIG. 4 shows that viewers can vote on the content by indicating a "thumbs up" which will be interpreted by the Attention Sensor Module 201 as a vote. In other examples, other voting gestures, symbols, icons, and the like may be incorporated. The Attention Sensor Module 201 provides this gesture data to the Analysis Module 202, which can recognize and count the number of thumbs-up gestures the viewers are physically showing, effectively voting on the displayed content.

The system can also utilize audio data for content ratings. Viewers can also rate content by using an application or web-based user interface provided by the DCAES on their personal or mobile devices.

The System also can maintain a database of ratings for all of the content that is shown on the shared digital display. This can be used to optimize the display of content in real time to increase viewer engagement. These ratings may also be analyzed after the fact such as by the Analysis Module 202, and be used to identify the content that is most engaging so it can be used in new Content Templates and displays.

The shared digital display typically includes system generated content such as promotional messages, advertising, scheduling information, or other information provided by the owner or operator of the shared display. This information may fill part or the entire screen depending on the state of the shared display at the time. For example, the system generated content 402 in FIG. 4 is located on the right hand side of the entire shared display, leaving the left hand side for viewer generated or other content.

The DCAES also includes the option for the viewer who chooses to create personalized content to draw on the screen. The viewer may start with a blank screen, or start with a template provided by the system. For instance, the system may provide the outline of a bottle or can, and the viewer may draw his or her own design on the template. For example, the bottle may be a Coke bottle and the user may draw a new design on it. Or the template could be a new car, and the viewer could create a new color scheme for the car. Once the drawing is completed, the viewer may submit it for a popularity vote by the other viewers or by other people who may be accessible through social media or other systems. The drawings and their popularity rating can be automatically stored in the content database. Examples of drawing interfaces include interfaces such as paint programs, drag and drop interfaces with stored objects, and interfaces for creating drawings using stored images from smartphones.

Figure 5:
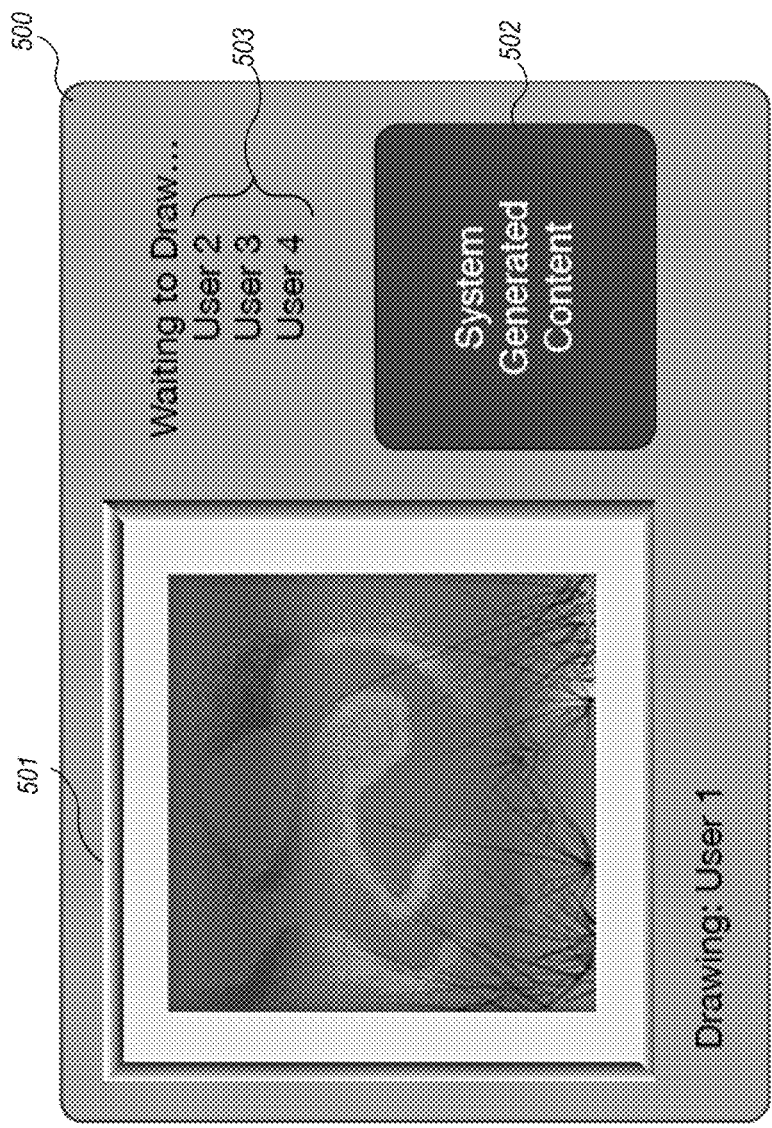
FIG. 5 is an example diagram of dynamic viewer generated content in a Dynamic Content Analysis and Engagement System using a Paint application.

FIG. 5 is an example diagram of dynamic viewer generated content in a Dynamic Content Analysis and Engagement System using a Paint application. In FIG. 5, shared digital display 500 includes viewer generated drawing 501, system generated content 502, and a queue 503 of other viewers waiting to draw content on the display. As explained, the drawing 501 may be based upon a template, another drawing, picture, or image, or other outline as described in detail in U.S. Patent Application No. 62/134,708, entitled "An Electronic System For Creating and Displaying an Artwork and System to Facilitate Communication Between Digital Signage and Mobile Devices," filed Mar. 18, 2015, and incorporated herein by reference in its entirety.

Although the techniques of DCAES are generally applicable to any type of digital display, the phrase "shared display" or "digital display" or "shared digital display" is used generally to imply any type of electronic display that can be engaged in by one or more users or viewers. Essentially, the concepts and techniques described are applicable to any environment where an electronic display can be updated in near real time based upon measured engagement data. Also, although certain terms are used primarily herein, other terms could be used interchangeably to yield equivalent embodiments and examples. In addition, terms may have alternate spellings which may or may not be explicitly mentioned, and all such variations of terms are intended to be included.

Example embodiments described herein provide applications, tools, data structures and other support to implement a Dynamic Content Analysis and Engagement System. Other embodiments of the described techniques may be used for other purposes. In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the logic, different logic, etc. Thus, the scope of the techniques and/or functions described are not limited by the particular order, selection, or decomposition of aspects described with reference to any particular routine, module, component, and the like.

Figure 6:
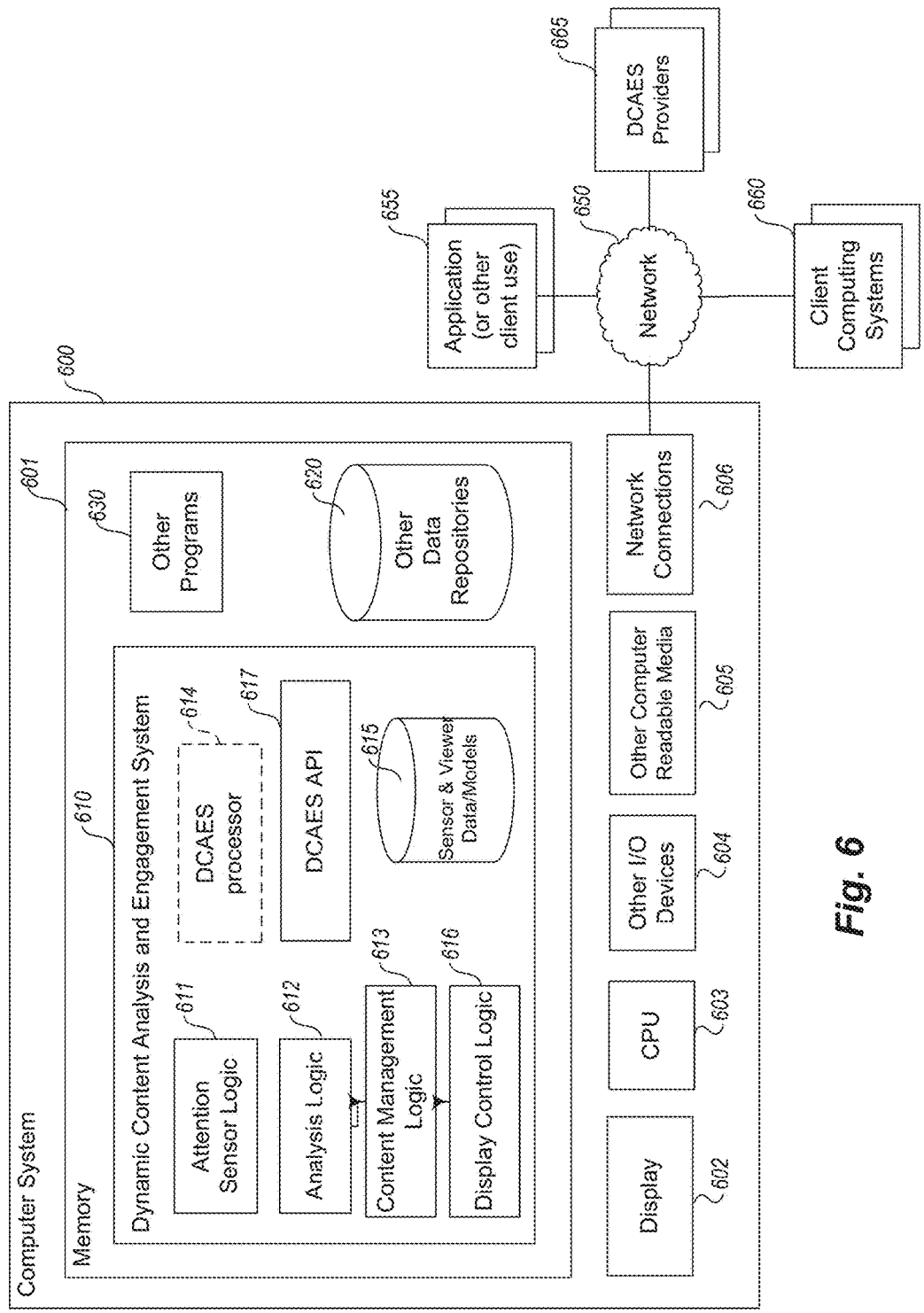
FIG. 6 is an example computing system for practicing embodiments of an example Dynamic Content Analysis and Engagement System described herein.

FIG. 6 is an example computing system for practicing embodiments of an example Dynamic Content Analysis and Engagement System described herein. Note that a virtual or physical computing system suitably instructed so that it is a special purpose computing system used to measure the engagement and manage the content of shared digital displays may be used to implement an DCAES. Further, the DCAES may be implemented in software, hardware, firmware, or in some combination to achieve the capabilities described herein. As mentioned, the DCAES processing logic may reside local or remote to the attention sensor such as Attention Sensor Module 302 of FIG. 3.

The computing system 600 may comprise one or more server and/or client computing systems and may span distributed locations. In addition, each block shown may represent one or more such blocks as appropriate to a specific embodiment or may be combined with other blocks. Moreover, the various blocks of the DCAES 610 may physically reside on one or more machines, which use standard (e.g., TCP/IP) or proprietary interprocess communication mechanisms to communicate with each other.

In the embodiment shown, computer system 600 comprises a computer memory ("memory") 601, a display 602, one or more Central Processing Units ("CPU") 603, Input/Output devices 604 (e.g., keyboard, mouse, CRT or LCD display, etc.), other computer-readable media 605, and one or more network connections 606. The DCAES 610 is shown residing in memory 601. In other embodiments, some portion of the contents, some of, or all of the components of the DCAES 610 may be stored on and/or transmitted over the other computer-readable media 605. The components of the DCAES 610 preferably execute on one or more CPUs 603 and manage the measurement and optimization of viewer engagement of content on shared digital displays, as described herein. Other code or programs 630 and potentially other data repositories, such as data repository 620, also reside in the memory 601, and preferably execute on one or more CPUs 603. Of note, one or more of the components in FIG. 6 may not be present in any specific implementation. For example, some embodiments embedded in other software may not provide means for user input or display.

In a typical embodiment, the DCAES 610 includes one or more Attention Sensor Logic 611, one or more Analysis Logic 612, one or more Content Management Logic 613, and Display Control Logic 614 as described in detail with respect to FIG. 2. In at least some embodiments, some of the components are provided external to the DCAES or to the attention sensors and are available, potentially, over one or more networks 650. Other and/or different modules may be implemented. In addition, the DCAES may interact via a network 650 with application or client code 655 that uses the engagement, viewer, or content data provided by the DCAES 610, one or more client computing systems 660, and/or one or more third-party information provider systems 665, such as provides of 3D models of viewers, facial gesture information, etc. Also, of note, the sensor and viewer data repository 615 may be provided external to the DCAES as well, for example in a knowledge base accessible over one or more networks 650.

In an example embodiment, components/modules of the DCAES 610 are implemented using standard programming techniques. For example, the DCAES 610 may be implemented as a "native" executable running on the CPU 103, along with one or more static or dynamic libraries. In other embodiments, the DCAES 610 may be implemented as instructions processed by a virtual machine. A range of programming languages known in the art may be employed for implementing such example embodiments, including representative implementations of various programming language paradigms, including but not limited to, object-oriented, functional, procedural, scripting, and declarative.

The embodiments described above may also use well-known or proprietary, synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously and communicate using message passing techniques. Equivalent synchronous embodiments are also supported.

In addition, programming interfaces to the data stored as part of the DCAES 610 (e.g., in the data repository 615) can be available by standard mechanisms such as through C, C++, C#, and Java APIs; libraries for accessing files, databases, or other data repositories; through scripting languages such as XML; or through Web servers, FTP servers, or other types of servers providing access to stored data. The data repository 615 may be implemented as one or more database systems, file systems, or any other technique for storing such information, or any combination of the above, including implementations using distributed computing techniques.

Also the example DCAES 610 may be implemented in a distributed environment comprising multiple, even heterogeneous, computer systems and networks. Different configurations and locations of programs and data are contemplated for use with techniques of described herein. In addition, the [server and/or client] may be physical or virtual computing systems and may reside on the same physical system. Also, one or more of the modules may themselves be distributed, pooled or otherwise grouped, such as for load balancing, reliability or security reasons. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.) and the like. Other variations are possible. Also, other functionality could be provided by each component/module, or existing functionality could be distributed amongst the components/modules in different ways, yet still achieve the functions of an DCAES.

Furthermore, in some embodiments, some or all of the components of the DCAES 610 may be implemented or provided in other manners, such as at least partially in firmware and/or hardware, including, but not limited to one or more application-specific integrated circuits (ASICs), standard integrated circuits, controllers executing appropriate instructions, and including microcontrollers and/or embedded controllers, field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., a hard disk; memory; network; other computer-readable medium; or other portable media article to be read by an appropriate drive or via an appropriate connection, such as a DVD or flash memory device) to enable the computer-readable medium to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 7:
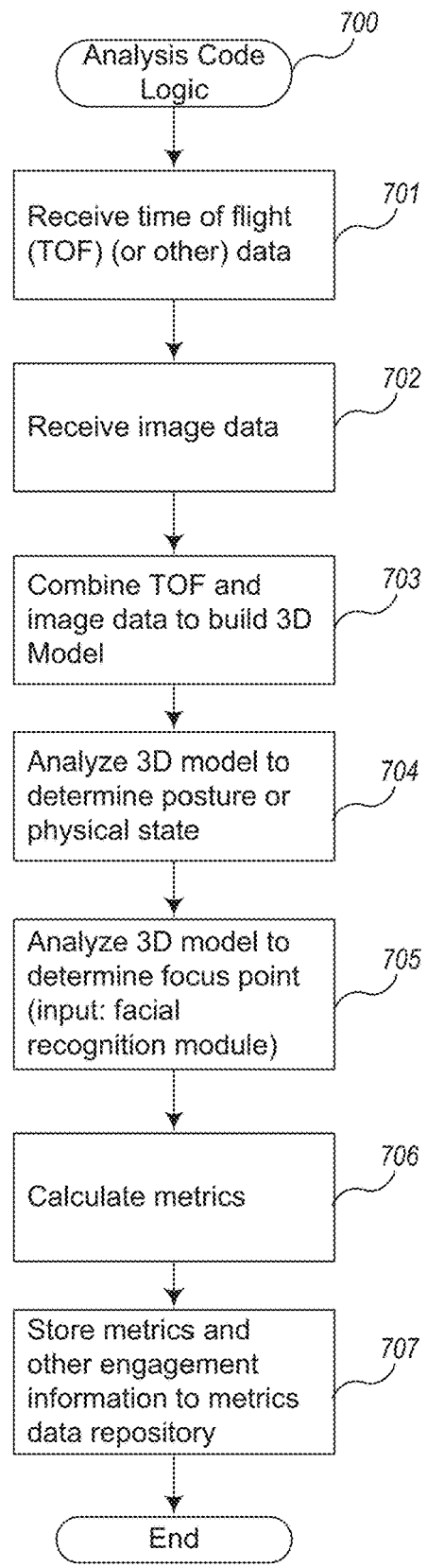
FIG. 7 is an example flow diagram of the code logic used by an analysis module of the DCAES to perform modeling and compute metrics to determine engagement.

As described in FIGS. 1-5, one of the functions of the DCAES is to model viewers and calculate metrics regarding engagement. FIG. 7 is an example flow diagram of the code logic used by an analysis module of the DCAES (e.g., Analysis Module 202 of FIG. 2) to perform modeling and compute metrics to determine engagement. In block 701, time of flight data is received from the time of flight sensor, and is stored for use in the analysis of viewers. In block 702, image data of the same scene is received and stored for the use in analysis of viewers. In block 703, that data is combined to create a three dimensional (or multidimensional) model of the scene which may include one or more viewers. This typically includes using the time of flight data to create a depth map, which can then be combined with the image data to create individual three dimensional models of viewers. In block 704, these three dimensional models of viewers may be analyzed by software optimized to recognize and classify different postures including to determine whether the viewer is facing the screen, what level of attention the viewer is paying to the content, and/or similar analyses. Audio data may also be analyzed to rate engagement. Similarly in block 705, standard algorithms which may include facial recognition software and/or software that is optimized to calculate the focus point of the viewer may be used to identify the focus point in x,y,z coordinates. This allows the system to determine what specific information (e.g., objects, content, and the like) the viewer is watching on the shared display. In block 706, the DCAES calculates individual metrics such as arrival time, departure time, dwell time, and engagement level. In addition it can calculate crowd metrics such as crowd size, crowd turnover and crowd engagement level. Then, in block 707 these metrics and other engagement data are stored in a metrics data repository for further reference by other modules of the DCAES or by other external programs using an DCAES API or other programming interface.

Figure 8:
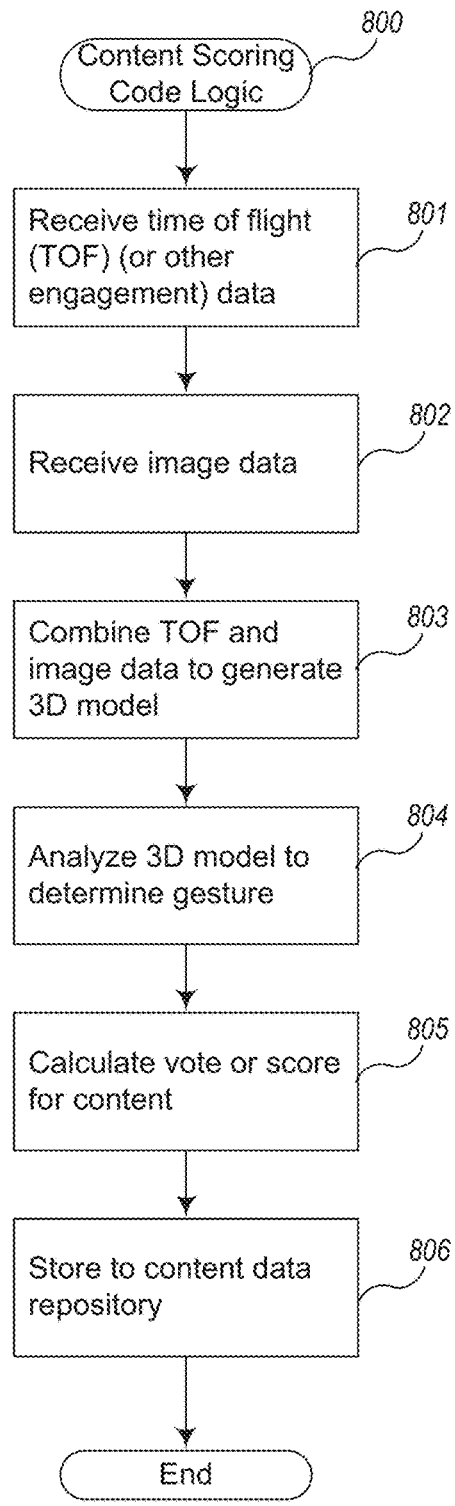
FIG. 8 is an example flow diagram of the code logic used by a content scoring logic of an analysis module of the DCAES to assist in optimizing the display of content in real time to increase viewer engagement.

FIG. 8 is an example flow diagram of the code logic used by a content scoring logic of an analysis module of the DCAES (e.g., Analysis Module 202 of FIG. 2) to assist in optimizing the display of content in real time to increase viewer engagement. For example, as described above if the ratings (score, vote, etc.) of the content of particular content providers is high, then presenting content by the highly rated viewers more often than not should increase engagement levels.

Specifically, in block 801, time of flight data is received from the time of flight sensor, and is stored for use in the analysis of viewers. In block 802, image data of the same scene is received and stored for the use in analysis of viewers. In block 803, that data is combined to create a three dimensional (or multidimensional) model of the scene which may include one or more viewers. This typically includes using the time of flight data to create a depth map, which can then be combined with the image data to create individual three dimensional models of viewers. In block 804, these three dimensional models of viewers may be analyzed by software optimized to recognize and classify different gestures including to determine whether the viewer is making a thumbs up or thumbs down gesture. This software can identify a multiplicity of other gestures signifying approval, disapproval, and other types of judgments or opinions on information. This data can then be used to assign a rating to the content for voting, scoring, ranking or similar uses. Audio data may also be analyzed for rating purposes. Similarly in block 805, standard algorithms which may include facial recognition software and/or software that is optimized to calculate the focus point of the viewer may be used to identify the focus point in x,y,z coordinates. This allows the system to determine what specific information the viewer is watching on the shared display. In block 806, the DCAES calculates content metrics such as content observed, content dwell time, and content engagement level. In addition it can calculate crowd metrics such as crowd size, crowd turnover and crowd engagement level. Then, in block 807 these metrics and other engagement data are stored in a metrics data repository for further reference by other modules of the DCAES or by other external programs using an DCAES API or other programming interface.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 62/134,708, entitled "Electronic System For Creating and Displaying an Artwork and System to Facilitate Communication Between Digital Signage and Mobile Devices," filed Mar. 18, 2015, are incorporated herein by reference, in their entirety.

From the foregoing it will be appreciated that, although specific embodiments have been described herein for purposes of illustration, various modifications may be made without deviating from the spirit and scope of the invention. For example, the methods and systems for managing the content of shared digital displayed discussed herein are applicable to other architectures. Also, the methods, techniques, and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A system for sensing and analyzing a level of engagement of viewers with content outputted to a shared digital display comprising:
    an attention sensor comprising one or more sensors proximately located to the shared digital display and configured to detect presence of one or more viewers within a determined range of the shared digital display and configured to detect image and/or audio data associated with each viewer; and
    a computing system configured to:
        analyze the presence and image and/or audio data associated with each viewer detected by the attention sensor to generate engagement metrics regarding each viewer, the generated engagement metrics comprising individual viewer metrics and crowd metrics, the individual viewer metrics including at least arrival time, departure time, viewing time, and viewer dwell time, and the crowd metrics including at least one of crowd size, crowd turnover, crowd engaged, crowd disengaged, or a crowd engagement rating; and in near real time, dynamically reconfigure content presented on the shared digital display based upon the generated engagement metrics.

2. The system of claim 1 wherein the attention sensor comprises a time of flight sensor that is configured to detect presence of each viewer with the determined range of the shared digital display.

3. The system of claim 1 wherein the attention sensor comprises a camera configured to sense image data associated with each viewer.

4. The system of claim 1 wherein the one or more sensors comprise wireless access points, beacon technology, electromagnetic radiation, infrared, microphones, and/or sound wave sensors.

5. The system of claim 1 wherein the computing system solicits and receives personalized content from the one or more viewers transforming them from passive viewers into active contributors thereby increasing their level of engagement.

6. The system of claim 1 wherein the computing system comprises:
an analysis module configured to generate and store the engagement metrics including determining a model of the one or more viewers within the determined range of the shared digital display;
a content management module configured to store, retrieve, and queue content; and
a display control module configured to receive content from the content management module and dynamically reconfigure and output the received content in near real time based upon the stored engagement metrics, wherein at least one of the metrics is based upon the model of the one or more viewers, and wherein the reconfigured content incorporates content from a template.

7. The system of claim 6 wherein the analysis module is further configured to determine gestures associated with some of the one or more viewers and wherein a level of engagement with the presented content is calculated taking into account the one or more of the determined gestures.

8. The system of claim 6 wherein the content management module is further configured to queue content from and moderate between a plurality of viewers desirous of posting content to the shared digital display.

9. The system of claim 6 wherein the display control module combines system generated content with viewer specified content when dynamically reconfiguring the content to present on the shared digital display.

10. The system of claim 1 wherein the computing system comprises an analysis module that receives the detection and image and/or audio data associated with each viewer, analyzes the detection and image and/or audio data to generate and store the engagement metrics regarding each viewer.

11. The system of claim 1 wherein the engagement metrics further comprises content metrics relating to engagement.

12. The system of claim 1 wherein the engagement metrics further comprises viewer demographic metrics.

13. The system of claim 1 wherein the individual viewer metrics further comprises at least one of engaged, disengaged, engagement rating, or focus point.

14. The system of claim 1 wherein the crowd metrics comprise a crowd engagement rating.

15. The system of claim 11 wherein the content metrics further comprises at least one of content observed, content dwell time, or a content engagement rating.

16. The system of claim 1 wherein the engagement metrics comprises demographic data of a plurality of viewers including at least one of age, height, weight, ethnicity, gender, or language.

17. A method for sensing and analyzing a level of engagement of a plurality of viewers with content outputted to a shared digital display comprising:
receiving data from an attention sensor detecting presences of one or more viewers within a determined range of the shared digital display and detecting image and/or audio data associated with each viewer;
combining the detected presence data and the image and/or audio data for each viewer to generate a multidimensional model to determine posture and/or physical state of each viewer;
analyzing the multidimensional model to determine focal point for each viewer;
calculating engagement metrics based upon the determined focal point, the engagement metrics comprising individual viewer metrics and crowd metrics, the individual viewer metrics including at least arrival time, departure time, viewing time, and viewer dwell time, and the crowd metrics including at least one of crowd size, crowd turnover, crowd engaged, crowd disengaged, or a crowd engagement rating; and
generating and reconfiguring content in near real time to present modified content on the shared digital display based upon the calculated engagement metrics.

18. The method of claim 17, further comprising:
analyzing the multidimensional model to determine a gesture associated with one or more viewers proximate to the shared digital display;
determine a vote or score for the content outputted to the shared digital display; and
generate and/or reconfigure content in near real time to present changed content on the shared digital display based upon the determined vote or score.

19. A non-transitory computer readable storage medium containing instructions for controlling a computer processor to determine a level of engagement with content presented on a shared digital display by performing a method comprising:
receiving data from an attention sensor detecting presences of one or more viewers within a determined range of the shared digital display and detecting image and/or audio data associated with each viewer;
combining the detected presence data and the image and/or audio data for each viewer to generate a multidimensional model associated with each viewer;
analyzing the multidimensional model to determine focal point for each viewer and an individual engagement metric including at least one of dwell time, viewing time, arrival time, or departure time;
calculate engagement metrics based upon the determined focal point and the individual engagement metric, the engagement metrics comprising individual viewer metrics and crowd metrics, the individual viewer metrics including at least arrival time, departure time, viewing time, and viewer dwell time, and the crowd metrics including at least one of crowd size, crowd turnover, crowd engaged, crowd disengaged, or a crowd engagement rating; and generating and reconfiguring content in near real time for the shared digital display based upon the calculated engagement metrics.

* * * * *